(12) United States Patent
Meyers et al.

(10) Patent No.: US 7,629,708 B1
(45) Date of Patent: Dec. 8, 2009

(54) REDUNDANT POWER SYSTEM HAVING A PHOTOVOLTAIC ARRAY

(75) Inventors: Gerald Meyers, Overland Park, KS (US); Kevin P. Kenny, Ashburn, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 57 days.

(21) Appl. No.: 11/875,102

(22) Filed: Oct. 19, 2007

(51) Int. Cl.
*H02J 7/00* (2006.01)
(52) U.S. Cl. ........................................ 307/66
(58) Field of Classification Search ............... 307/66
See application file for complete search history.

(56) References Cited

U.S. PATENT DOCUMENTS

| | | | |
|---|---|---|---|
| 3,517,508 A | 6/1970 | Newman et al. | |
| 4,080,271 A | 3/1978 | Brown | |
| 4,161,657 A | 7/1979 | Shaffer, Jr. | |
| 4,326,013 A | 4/1982 | Jacobi et al. | |
| 4,341,607 A | 7/1982 | Tison | |
| 4,484,104 A | 11/1984 | O'Brien | |
| 4,632,091 A | 12/1986 | Wiens | |
| 5,362,267 A | 11/1994 | Forrest | |
| 5,512,787 A | 4/1996 | Dederick | |
| 5,617,288 A * | 4/1997 | Zaretsky | ............ 361/127 |
| 5,667,647 A | 9/1997 | Suga et al. | |
| 5,737,202 A | 4/1998 | Shimamori | |
| 5,767,584 A | 6/1998 | Gore et al. | |
| 6,134,124 A * | 10/2000 | Jungreis et al. | ............ 363/34 |
| 6,452,289 B1 | 9/2002 | Lansberry et al. | |
| 6,649,289 B2 | 11/2003 | Hsu et al. | |
| 6,674,263 B2 | 1/2004 | Agbossou et al. | |
| 6,833,631 B2 | 12/2004 | Van Breems | |
| 6,841,893 B2 | 1/2005 | Maiwald et al. | |
| 6,930,402 B1 | 8/2005 | Johnson et al. | |
| 6,960,838 B2 | 11/2005 | Johnson | |
| 7,112,891 B2 | 9/2006 | Johnson et al. | |
| 7,145,265 B2 * | 12/2006 | Mc Nulty et al. | ............ 307/44 |
| 7,298,053 B2 | 11/2007 | Johnson et al. | |
| 2001/0009338 A1 | 7/2001 | Reutere | |
| 2002/0114983 A1 | 8/2002 | Frank et al. | |

FOREIGN PATENT DOCUMENTS

| | | |
|---|---|---|
| DE | 3150758 A1 | 7/1983 |
| EP | 0595191 A1 | 5/1994 |
| EP | 0718094 A | 6/2006 |
| JP | 58066760 A | 4/1983 |
| JP | 404171667 A | 6/1992 |
| JP | 11182940 A | 7/1999 |

(Continued)

*Primary Examiner*—Robert L. Deberadinis

(57) ABSTRACT

Systems and methods provide a redundant electrical power supply solution, where an AC power source is called upon when a photovoltaic subsystem is unavailable to meet the power consumption needs of telecommunications site equipment. In one aspect, a system for supplying electrical power includes a DC bus with which telecommunications site equipment is coupled, as well as a photovoltaic subsystem and a second power delivery circuit. The photovoltaic subsystem includes a solar photovoltaic array, a disconnect for controlling electrical connection between the solar photovoltaic array and the DC bus, as well as a DC/DC voltage converter. The second power delivery circuit includes a rectifier for converting incoming AC voltage from an AC power source to output DC voltage delivered at the DC bus upon sensing a condition where the photovoltaic subsystem delivers insufficient DC voltage to the DC bus.

13 Claims, 2 Drawing Sheets

FOREIGN PATENT DOCUMENTS

| | | |
|---|---|---|
| JP | 2001338672 A | 12/2001 |
| JP | 2004162673 A | 6/2004 |
| JP | 2004171973 | 6/2004 |
| JP | 2005053353 | 3/2005 |
| JP | 2005276874 A | 10/2005 |

* cited by examiner

REDUNDANT POWER SYSTEM HAVING A PHOTOVOLTAIC ARRAY

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Systems and methods are provided for supplying electrical power to equipment at a telecommunications site. In embodiments, the systems and methods employ a photovoltaic subsystem directly tied to a DC bus. The systems and methods also employ an AC power source having an output converted to DC voltage supplied to the DC bus. The photovoltaic subsystem and AC power source work in concert to provide the necessary electrical power for the telecommunications site equipment coupled with the DC bus. Specifically, a redundant electrical power supply solution is realized by operation of the AC power source when the photovoltaic subsystem is unavailable to meet the power consumption needs of the telecommunications site equipment.

In one aspect, a system for supplying electrical power to equipment at a telecommunications site includes a DC bus with which the telecommunications site equipment is coupled, as well as a photovoltaic subsystem and a second power delivery circuit. The photovoltaic subsystem includes a solar photovoltaic array, a disconnect for controlling electrical connection between the solar photovoltaic array and the DC bus, as well as a DC/DC voltage converter for converting the output DC voltage of the solar photovoltaic array to another DC voltage delivered at the DC bus. In this particular arrangement, the photovoltaic subsystem serves as a first power delivery circuit. The second power delivery circuit includes a rectifier for converting incoming AC voltage from an AC power source to output DC voltage delivered at the DC bus. The rectifier is operative to enable the AC power source to supply electrical power to the DC bus upon sensing a condition where the photovoltaic subsystem delivers insufficient DC voltage to the DC bus.

A method, in another aspect, relates to supplying electrical power to equipment at a telecommunications site, wherein such equipment is coupled with a DC bus. According to the method, a first power delivery circuit and a second power delivery circuit are provided for connection with the DC bus. The first power delivery circuit includes a solar photovoltaic array, a disconnect and a DC/DC voltage converter for converting the output DC voltage of the solar photovoltaic array to another DC voltage delivered at the DC bus. The second power delivery circuit includes a rectifier for converting incoming AC voltage from an AC power source to output DC voltage delivered at the DC bus. DC voltage is generated via the solar photovoltaic array, such that the first power delivery circuit supplies such DC voltage to the DC bus. Upon sensing a condition where the first power delivery circuit delivers insufficient DC voltage to the DC bus, the second power delivery circuit supplies DC voltage through the rectifier to the DC bus Additional advantages and features of the invention will be set forth in part in a description which follows, and in part will become apparent to those skilled in the art upon examination of the following, or may be learned by practice of the invention.

BRIEF DESCRIPTION OF THE SEVERAL VIEWS OF THE DRAWING

The present invention is described in detail below with reference to the attached drawing figures, wherein.

DETAILED DESCRIPTION

Embodiments of the present invention provide a solution for supplying electrical power to equipment at a telecommunications site. In embodiments, systems and methods of the present invention employ a photovoltaic subsystem directly tied to a DC bus, as well as an AC power source having an output converted to DC voltage supplied to the DC bus. The photovoltaic subsystem and AC power source work in concert to provide the necessary electrical power for the telecommunications site equipment coupled with the DC bus.

In an embodiment, the photovoltaic subsystem provides a power delivery circuit free of AC-to-DC or DC-to-AC voltage conversions (a "directly tied" subsystem). Any DC to AC voltage conversions for telecommunications site equipment can be accomplished on another circuit extending from the DC bus to such power consuming equipment. Further, in an embodiment, a rectifier receiving voltage from the AC power source provides the conversion to DC voltage. The rectifier also senses when insufficient DC voltage is being provided by the photovoltaic subsystem, and closes a circuit between the AC power source and the DC bus, so that the electrical power needs of the telecommunications site equipment are met by the combined output of the photovoltaic subsystem and the AC power source, or by the AC power source alone if the photovoltaic subsystem is currently producing no DC voltage. Accordingly, a redundant power supply solution is realized through the embodiments of the present invention.

Figure 1:
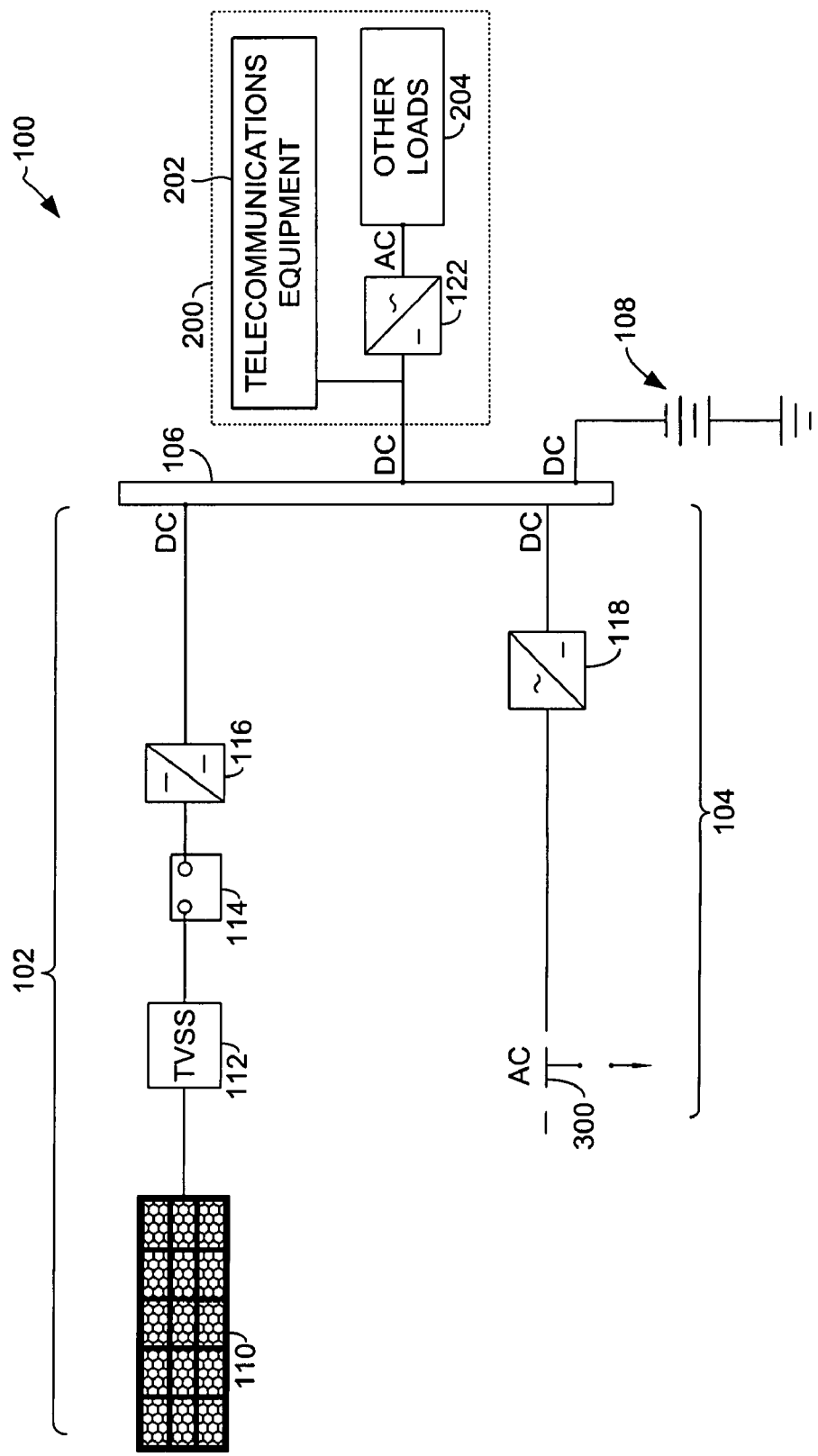
FIG. 1 is a schematic view of a system for supplying electrical power to equipment at a telecommunications site, in accordance with an embodiment of the present invention.

With initial reference to FIG. 1, an embodiment of an electrical power supply system 100 is depicted. The system 100 generally includes a first power delivery circuit 102 ("first circuit"), a second power delivery circuit 104 ("second circuit"), and a DC bus 106 with which the first and second circuits 102 and 104 are electrically coupled. Electronic equipment, such as equipment for enabling telecommunications activities, is electrically coupled with the DC bus 106 and consumes the electrical power provided by the first and/or second power delivery circuits 102 and 104. As one example, the electronic equipment may be a base transceiver station (BTS) and associated electronics for supporting wireless telecommunications. The electronic equipment is typically located at a telecommunications site, such as a shelter or other building housing the equipment. Accordingly, other power consuming loads (e.g., HVAC, lighting, and other devices) may also consume the electrical power from the DC bus 106. Such power consuming loads, along with the electronic equipment enabling telecommunications activities, coupled to the DC bus 106 are referred to herein as a "power consuming equipment" 200. Additionally, as explained in further detail below, the first and second power delivery circuits 102 and 104 selectively operate to provide the electrical power to meet the demands of the power consuming equipment 200.

Referring again to the first power delivery circuit 102, the first circuit 102 includes a solar photovoltaic array 110 generating DC voltage (also referred to herein as "DC power") from incident solar rays, a disconnect 114 controlling electrical connection between an output of the array 110 and the DC bus 106, and a DC/DC voltage converter 116 controlling the magnitude of the DC voltage supplied to the DC bus 106, collectively referred to herein as the photovoltaic subsystem. The first circuit 102 may also include a surge suppression component 112, such as a transient voltage surge suppressor (TVSS), to protect the various electrical components 110 of the system 100 from any periodic voltage surges generated by the solar photovoltaic array 110. Within the first circuit 102, DC voltage outputted by the solar photovoltaic array 110 travels to the disconnect 114, which either allows or disallows the voltage to continue traveling therealong to the DC bus 106. For instance, if the disconnect 114 is in an "open" position, an open circuit condition is created along the first circuit 102 and the solar photovoltaic array 110 becomes decoupled from the DC bus 106. Conversely, when the disconnect 114 is in a "closed" position, the first circuit 102 realizes a closed circuit condition and the output DC voltage continues on to the DC bus. The disconnect 114 may be, for instance, a low voltage disconnect (LVD) or a manual disconnect that requires an operator to move the disconnect between the open and closed positions. The DC/DC voltage converter 116 receives the output DC voltage of the solar photovoltaic array 110 (when the disconnect 114 creates a closed circuit condition) and converts the DC voltage to another fixed DC voltage value for delivery to the DC bus 106. As one example, the output DC voltage of the DC/DC voltage converter 116 may be in the 48-54 VDC range, such that the voltage supplied to the DC bus 106 meets the needs of telecommunications equipment 202 of the power consuming equipment 200 operating within such a voltage range.

It should be understood, however, that in an alternative embodiment, the surge suppression component 112, the disconnect 114 and the DC/DC voltage converter 116 may be rearranged within the first circuit 102 between the solar photovoltaic array 110 and the DC bus 106. For instance, the DC/DC voltage converter 116 may be located within the first circuit 102 between the suppression component 112 and the disconnect 114, as a matter of design choice.

With reference to the second power delivery circuit 104, the second circuit 104 generally includes a rectifier 118 receiving AC voltage from an AC power source 300 and converting the AC voltage to an output DC voltage for supply to the DC bus 106. The AC power source 300 generating and/or supplying AC voltage (also referred to herein as "AC power") may be, for instance, an electrical utility. It should be understood, however, that the AC power source 300 may take any form, and may be located locally with the system 100 (e.g., at a telecommunications site) or remotely from the system 100 (e.g., at another location on an electrical grid).

In an embodiment, the electrical power supply system 100 also includes one or more energy storage devices 108 electrically coupled with the DC bus 106. Each energy storage device 108 functions to provide a temporary DC voltage supply for the DC bus 106 when the first and second power delivery circuits 102 and 104 fail to supply adequate DC voltage to the DC bus 106 to meet the consumption demands of the power consuming equipment 200. As one example, the energy storage devices 108 may take the form of batteries/ fuel cells, capacitors, or any other type of energy storage device, and may provide an output DC voltage of around 48 VDC.

In operation, the rectifier 118 of the second circuit 104 senses when the DC voltage supplied by the first circuit 102 to the DC bus 106 drops below a predetermined value (a "low voltage condition"). For one exemplary arrangement, the predetermined value may be around 0.1 VDC below the normal output of the first circuit 102. It should be understood, however, that the rectifier 118 may be configured to sense a voltage drop of any other value that would cause the first circuit 102 to not adequately meet the needs of the power consuming equipment 200. Ideally, the first circuit 102 handles the power consumption needs of the power consuming equipment 200 based on having adequate sunlight incident on the solar photovoltaic array 110 for DC voltage generation. However, when the demands of the power consuming equipment 200 are not being met by the first circuit 102, the second circuit 104 provides the additional necessary power to maintain the DC voltage on the DC bus 106. The low voltage condition sensing is made via the second circuit 104 connection with the DC bus 106. Because an open circuit condition can be formed along the first circuit 102 by the disconnect 114, the rectifier 118 also senses when the disconnect 114 is moved to the open position at a time when the solar photovoltaic array 110 is producing an acceptable DC voltage output (e.g., an operator manually opening the disconnect 114), thus completely shutting off DC voltage supply to the DC bus 106 via the first circuit 102. In such a case, the second circuit 104 would be supplying the DC voltage at the DC bus 106 without any assistance from the first circuit 102.

The connection between the power consuming equipment 200 and the DC bus 106 may be referred to as a third circuit. The telecommunications equipment 202 and any other loads 204 making up the power consuming equipment 200 may operate under AC voltage or DC voltage. In the exemplary arrangement shown in FIG. 1, the telecommunications equipment 202 operates under DC voltage, while an inverter 122 converts DC voltage from the DC bus 106 to output AC voltage for consumption by the other loads 204. Additionally, in situations where the telecommunications equipment 202 and other loads 204 are located at a shelter or other building (not shown) housing the power consuming equipment 200, the solar photovoltaic array 110 may be arranged near or on such a shelter or other building. For instance, the solar photovoltaic array 110 may take the form of a thin film photovoltaic array mounted onto a roof of the shelter or building.

Figure 2:
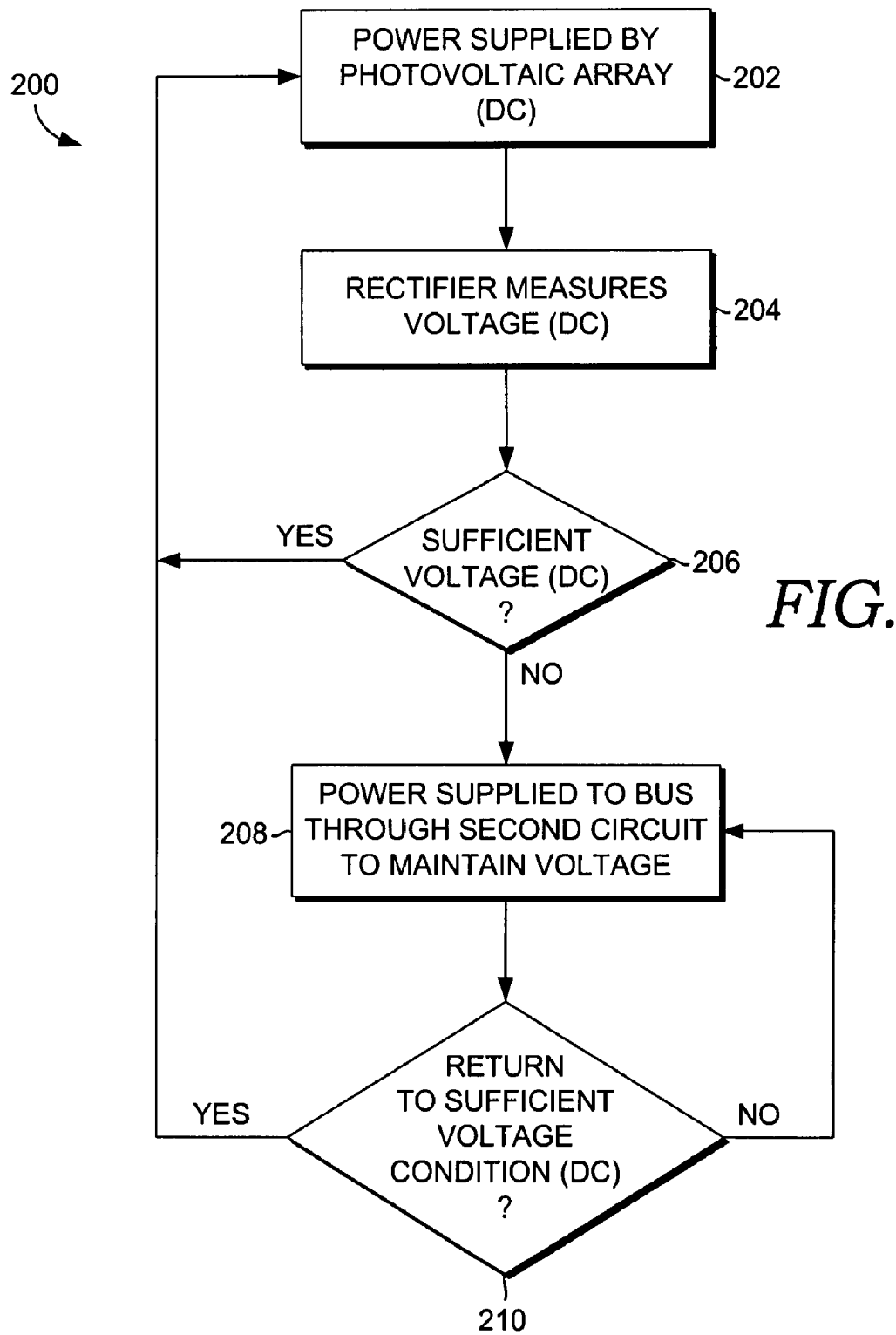
FIG. 2 is a flow diagram representative of a method for supplying electrical power to equipment at a telecommunications site, in accordance with an embodiment of the present invention.

Turning to FIG. 2, a flow diagram is representative of one method 200 for supplying electrical power to equipment at a telecommunication site utilizing the electrical power supply system 100. Initially, as shown at block 202, DC power is supplied by the solar photovoltaic array 110 through the first circuit 102 to the DC bus 106. The rectifier 118, at block 204, measures or senses the voltage condition on the DC bus 106 via the second circuit 104 connection therewith.

It is then determined by the rectifier 118, at block 206, whether sufficient DC voltage is being supplied by the first circuit 102 to the DC bus 106. If the solar photovoltaic array 110 generates sufficient DC voltage for delivery through the first circuit 102 to the DC bus 106, then the rectifier 118 remains in an idle state, and thus does not convert the AC voltage form the AC power source 300 to DC voltage for supply to the DC bus 106. The solar photovoltaic array 110 continues to supply DC power to the DC bus 106 (block 202) without assistance from the second circuit 104.

On the other hand, if it is determined, at block 206, that insufficient DC voltage is being supplied by the first circuit 102 to the DC bus 106, then at block 208, the second circuit 104 supplies DC power via the rectifier 118 closing the circuit between the AC power source 300 and the DC bus 106 and operating to convert the AC voltage to an output DC voltage for supply to the DC bus 106. The rectifier 118 is configured to provide an output that maintains the DC voltage at the DC bus 106 at a value equal to or above the predetermined value.

Thereafter, at block 210, it is determined whether the first circuit 102 has returned to supplying a sufficient DC voltage at the DC bus 106, as sensed by the rectifier 118. In conditions where the first circuit 102 is still failing to supply sufficient voltage to the DC bus 106, then the method 200 returns to step 208 where the rectifier 118 continues operation to maintain the sufficient DC voltage value at the DC bus 106. Alternatively, if the first circuit 102 has returned to supplying a sufficient DC voltage at the DC bus 106, then the rectifier 118 returns to the idle state, such that the second circuit 104 does not supply DC voltage at the DC bus 106. The method then returns to block 202, where the DC power is supplied by the solar photovoltaic array 110 through the first circuit 102 to the DC bus 106 without aid from the second circuit 104.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated to be within the scope of the claims. Additionally, it is intended that references to components of the present invention in the singular encompasses one or more of such components.

What is claimed is:

1. A system for supplying electrical power to equipment at a telecommunications site, comprising:
   a DC bus that interconnects the telecommunications site equipment with a first power delivery circuit and a second power deliver circuit;
   a photovoltaic subsystem serving as the first power delivery circuit for selectively delivering DC voltage to the DC bus, the photovoltaic subsystem including:
      (a) a solar photovoltaic array;
      (b) a disconnect for controlling electrical connection between the solar photovoltaic array and the DC bus; and
      (c) a DC/DC voltage converter for converting the output DC voltage of the solar photovoltaic array to another DC voltage delivered at the DC bus; and
   the second power delivery circuit for selectively delivering DC voltage to the DC bus, the second power delivery circuit including a rectifier that is configured to perform operations comprising:
      (a) sensing a low-voltage condition where the photovoltaic subsystem delivers insufficient DC voltage to the DC bus; and
      (b) incident to sensing the low-voltage condition, enabling an AC power source to supply DC voltage to the DC bus by converting incoming AC voltage from the AC power source to output the DC voltage delivered at the DC bus, wherein the DC voltage supplied by the AC power source is combined with the DC voltage from the photovoltaic subsystem to meet consumption demands of the telecommunications site equipment.

2. The system of claim 1, further comprising an energy storage device coupled with the DC bus, the energy storage device operative to deliver DC voltage to the DC bus during a time period when the photovoltaic subsystem and the AC power source fail to supply sufficient DC voltage to the DC bus to meet the demands of the telecommunications site equipment.

3. The system of claim 1, further comprising a third circuit coupling the telecommunications site equipment with the DC bus, the third circuit including an inverter for converting incoming DC voltage from the DC bus to output AC voltage delivered to the telecommunications site equipment.

4. The system of claim 1, wherein the photovoltaic subsystem includes a surge suppression component for inhibiting the travel of voltage surges from the solar photovoltaic array to the DC bus.

5. The system of claim 4, wherein the surge suppression component is disposed between the solar photovoltaic array and the disconnect.

6. A system for supplying electrical power to equipment at a telecommunications site, comprising:
   a DC bus with which the telecommunications site equipment is coupled;
   a first power delivery circuit including:
      (a) a solar photovoltaic array;
      (b) a disconnect for controlling an electrical connection between the solar photovoltaic array and the DC bus; and
      (c) a DC/DC voltage converter for converting the output DC voltage of the solar photovoltaic array to another DC voltage delivered at the DC bus; and
   a second power delivery circuit including a rectifier that is configured to perform operations comprising:
      (a) sensing a low-voltage condition where the first power delivery system delivers insufficient DC voltage to the DC bus; and
      (b) incident to sensing the low-voltage condition, enabling an AC power source to supply DC voltage to the DC bus by converting incoming AC voltage from the AC power source to output the DC voltage delivered at the DC bus, wherein the DC voltage supplied by the AC power source is combined with the DC voltage from the first power delivery system to meet consumption demands of the telecommunications site equipment.

7. The system of claim 6, further comprising an energy storage device coupled with the DC bus, the energy storage device operative to deliver DC voltage to the DC bus during a time period when the first power delivery circuit and the second power delivery circuit fail to supply sufficient DC voltage to the DC bus to meet the demands of the telecommunications site equipment.

8. The system of claim 6, further comprising a third circuit coupling the telecommunications site equipment with the DC bus, the third circuit including an inverter for converting incoming DC voltage from the DC bus to output AC voltage delivered to the telecommunications site equipment, wherein the telecommunications equipment is located in a building, and wherein a thin film of the solar photovoltaic array is mounted to a roof of the building.

9. The system of claim 6, wherein the a first power delivery circuit includes a surge suppression component for inhibiting the travel of voltage surges from the solar photovoltaic array to the DC bus.

10. The system of claim 9, wherein the surge suppression component is disposed between the solar photovoltaic array and the disconnect.

11. A method for supplying electrical power to equipment at a telecommunications site, the equipment being coupled with a DC bus, the method comprising:

providing a first power delivery circuit connected with the DC bus, including a solar photovoltaic array, a disconnect and a DC/DC voltage converter for converting the output DC voltage of the solar photovoltaic array to another DC voltage delivered at the DC bus;

providing a second power delivery circuit connected with the DC bus, including a rectifier for converting incoming AC voltage from an AC power source to output DC voltage delivered at the DC bus;

generating DC voltage via the solar photovoltaic array;

delivering, by the first power delivery circuit, the DC voltage from the solar photovoltaic array to the DC bus; and sensing, by the rectifier in the second power delivery circuit, that the solar photovoltaic array accommodated in the first power delivery circuit is exhibiting a low-voltage condition, wherein the low-voltage condition occurs when the output DC voltage of the solar photovoltaic array is insufficient to meet consumption demands of the telecommunications site equipment;

delivering, by the second power delivery circuit, DC voltage to the DC bus upon sensing the low-voltage condition, wherein the DC voltage delivered by the second power delivery circuit, when combined with the DC voltage from the first power delivery system, is at a value equal the consumption demands of the telecommunications site equipment.

12. The method of claim 11, further comprising:

providing an energy storage device coupled with the DC bus; and delivering, by the energy storage device, DC voltage to the DC bus during a time period when the first power delivery circuit and the second power delivery circuit fail to deliver sufficient DC voltage to the DC.

13. The method of claim 11, further comprising:

sensing a condition where the first power delivery circuit is capable of delivering sufficient DC voltage to the DC bus after previously sensing the low-voltage condition;

enabling the delivery, by the first power delivery circuit, of the DC voltage from the solar photovoltaic array to the DC bus; and disabling the delivery, by the second power delivery circuit, of the DC voltage from the rectifier to the DC bus.

* * * * *